(No Model.)   3 Sheets—Sheet 1.
F. A. KRESS.
MACHINE FOR MAKING FABRIC FOR VEHICLE TIRES.
No. 561,114.   Patented June 2, 1896.
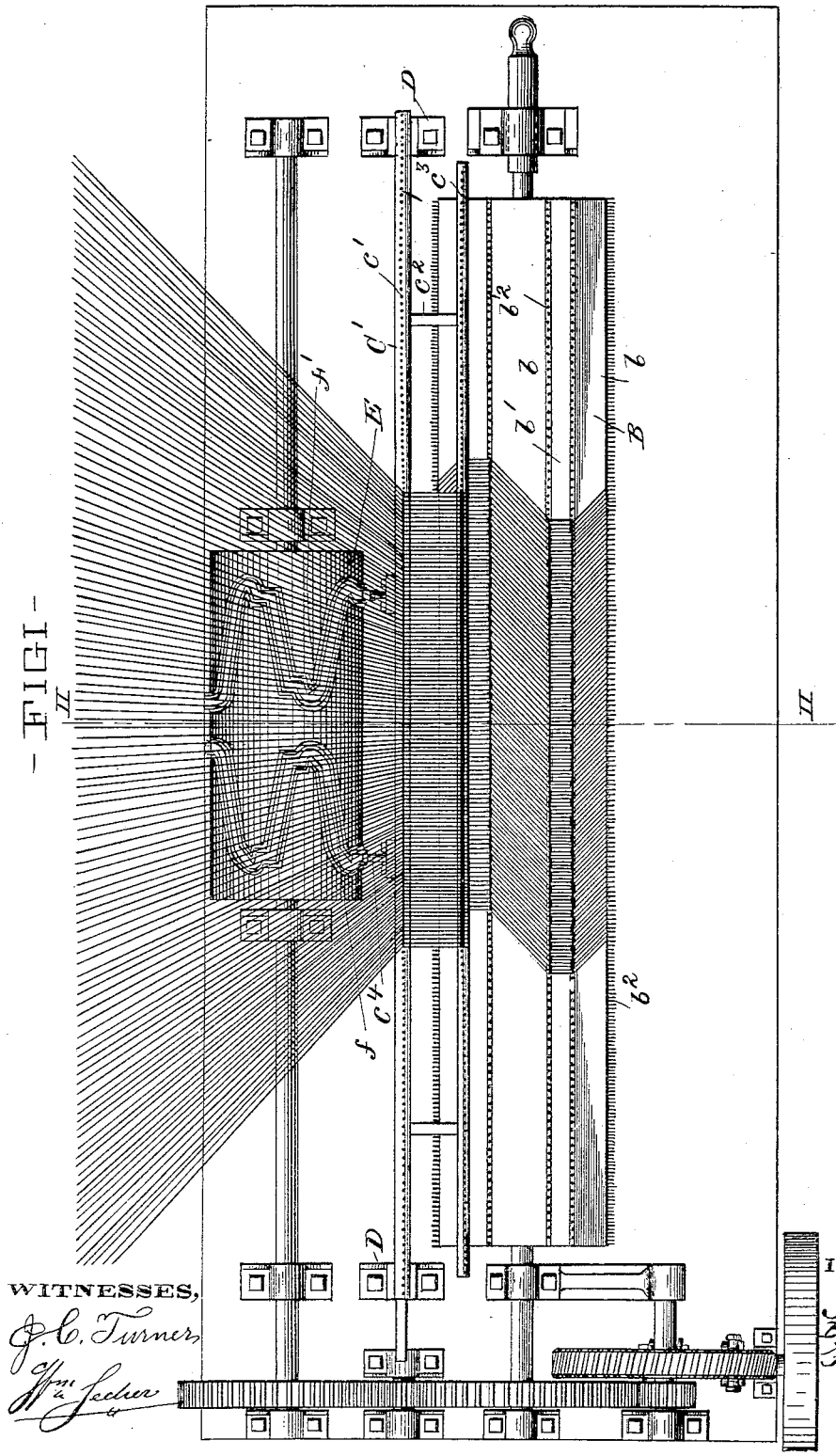

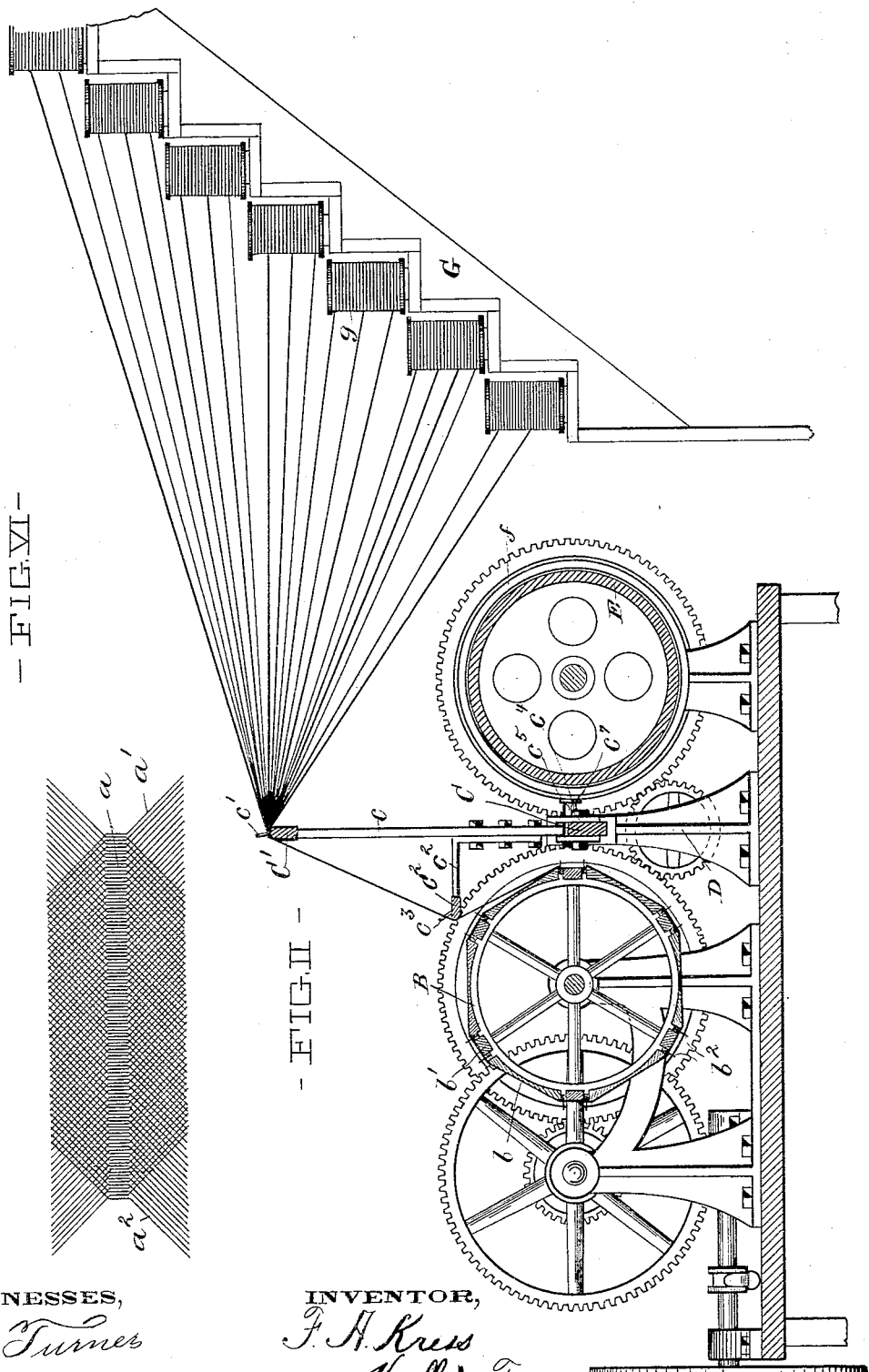

(No Model.) 3 Sheets—Sheet 3.
F. A. KRESS.
MACHINE FOR MAKING FABRIC FOR VEHICLE TIRES.
No. 561,114. Patented June 2, 1896.
- FIG. III -
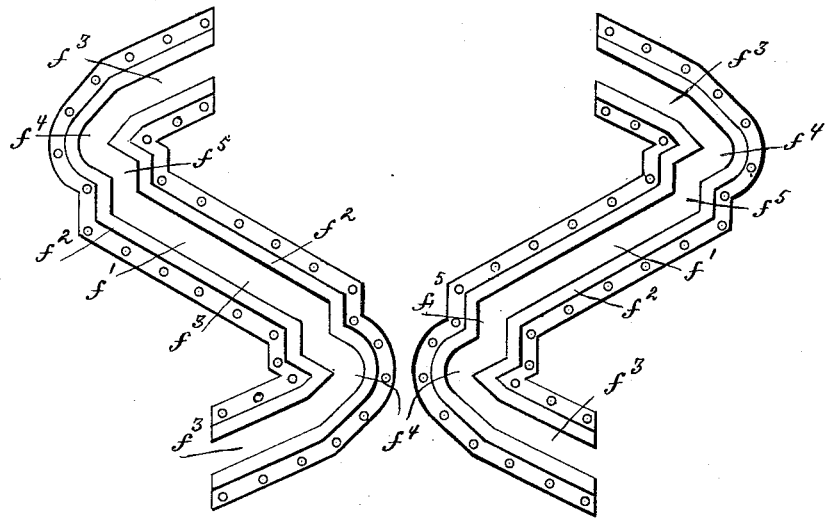
- FIG. IV -
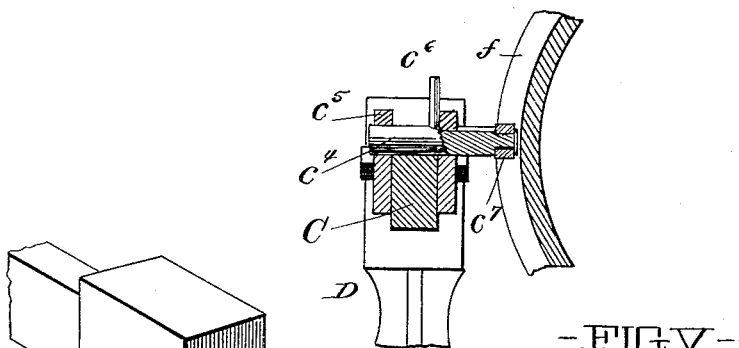
- FIG. V -
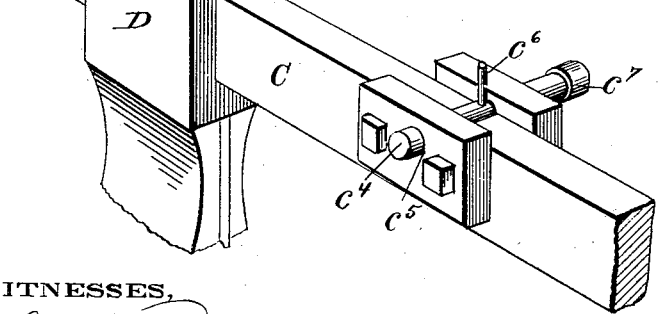
WITNESSES,
J. C. Turner
Wm Lechner
INVENTOR,
F. A. Kress
By Hall & Fay
Attys.

UNITED STATES PATENT OFFICE.

FREDRICK A. KRESS, OF CLEVELAND, OHIO, ASSIGNOR TO THE MECHANICAL RUBBER COMPANY, OF NEW YORK, N. Y.

MACHINE FOR MAKING FABRIC FOR VEHICLE-TIRES.

SPECIFICATION forming part of Letters Patent No. 561,114, dated June 2, 1896.

Application filed May 31, 1895. Serial No. 551,048. (No model.)

*To all whom it may concern:*

Be it known that I, FREDRICK A. KRESS, a citizen of the United States, and a resident of Cleveland, county of Cuyahoga, and State of Ohio, have invented certain new and useful Improvements in Machines for Making Fabric for Vehicle-Tires, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a top plan view of my improved machine for making fabric for pneumatic rubber tires; Fig. II, a vertical section on the line II II in Fig. I of the machine; Fig. III, a view of a section of the cam-grooves upon the cam-cylinder, showing such section flattened; Fig. IV, a detail view of one of the sliding lugs upon the shifting-bar; Fig. V, a perspective detail view of said lug and bar, and Fig. VI a view of the fabric produced by the machine.

Rubber tires for vehicle-wheels, and particularly pneumatic tires for bicycle or sulky wheels, are usually reinforced by a layer of textile fabric vulcanized or otherwise secured or imbedded into the tube or sheath of the tire. If such fabric, however, is woven in the ordinary manner, the tread of the tire will be liable to be less resilient than is desirable on account of the threads in the fabric being tied, one to the other, by their being interwoven. The threads in such fabric will also be liable to cut one another on account of the sawing action of the interwoven threads during the compression and expansion of the inflated tire when the latter rolls over the ground. To avoid the first of these drawbacks in the reinforcing fabric, it has been proposed to make a fabric in which the portion at the tread of the tire consisted of transverse threads only. It has also been proposed to make a fabric in which the threads cross one another without being interwoven, the threads being held in position by a rubber or other suitable cement.

My machine is principally designed to construct a fabric for use in pneumatic bicycle-tires which will have single transverse threads at the tread portion of the tire and diagonally-crossed, but not interwoven, threads at the remaining portions, whereby a strong and elastic fabric is produced, which will preserve the highest degree of resiliency at the tread of the tire and in which the crossed threads will not chafe each other when the tire is in active use. Such fabric is illustrated in Fig. VI of the drawings, in which the letter $a$ indicates the parallel transverse portions of the threads of both layers, which portions are at the tread portion of the tire, and $a'$ and $a^2$ indicate, respectively, the superimposed and diagonally - crossing thread portions. The threads are laid in a blunt V shape. The machine may, however, be employed for making other forms of fabric by altering the arrangement of combs, the shape of the drum, and the mechanism for laying the threads upon the drum. As the threads are coated and held together by the rubber cement, so as to form one sheet, fabric can be and is made with all of the threads straight and parallel.

The fabric is laid upon a drum B of prismatic outline, having suitable means for rotating it. The drum illustrated in the drawings is in the shape of a hexagonal prism, having its angles flattened. The drum will thus have six flat sides $b$ and six flat edges $b'$, each bordered by two parallel rows of pins $b^2$, placed as close together as it is desired to have the thread laid in the fabric, said rows of pins thus forming combs. A bar C is supported to slide parallel with the drum in suitable bracket-bearings D, and said bar has upright brackets $c$ projecting from its upper side, to the upper ends of which brackets a horizontal comb-bar C' is secured, having a row of pins $c'$ upon its upper edge corresponding to the rows of pins upon the flat corners of the drum. A comb-bar C² is supported upon the ends of brackets $c^2$, which project from the upright brackets $c$ toward and partly over the drum, and said bar has a row of pins $c^3$ corresponding to the pins upon the bar C' and upon the drum. A cam-cylinder E is journaled parallel to the drum and is suitably geared to the latter so as to make the same number of revolutions as the drum. The cam-cylinder has two cam-grooves $f$ and $f'$, each groove in the present case being formed by flanges $f^2$, secured to the circumference of the cylinder. The grooves are made in zigzag shape, each bent in opposite form to the other, and each groove has six straight and oblique portions $f^3$, six curved corners $f^4$, and six short straight portions $f^5$, which follow circumferential lines of the cylinder. The groove portions on the cam-cylinder thus correspond to the flat sides and flat edges of the drum, the number of oblique portions, curved corners, and straight circumferential groove portions corresponding to the number of sides and edges of the drum. Two lugs $c^4$ slide in seats $c^5$ in the bar C and have handles $c^6$ for sliding them into or out of the cam-grooves and rollers $c^7$ upon the ends which enter the cam-grooves. A bank G of spools $g$, which contain the threads from which the fabric is made, is arranged parallel with the drum, shifting-bar, and cam-cylinder, so that the several threads may be carried from their spools between the pins upon the upper comb-bar C', between the pins upon the lower comb-bar $C^2$, to the drum. When the fabric is first started, the threads are united in pairs at their ends and each loop thus formed is slipped over a pin in one comb upon the drum. One sliding lug is thrown into engagement with its cam-groove and the machine is started to make one revolution of the drum and cam-cylinder. The comb-bars will carry the threads in a zigzag form over the drum, slipping them between the combs upon the drum, so as to retain them in shape. When the drum has made one revolution, the first sliding lug is drawn back and the other lug thrown into its cam-groove, when the zigzag of the threads will be reversed. A rubber or other suitable cement is preferably spread over the first layer of threads, so that the layer of threads crossing the threads in the first layer may adhere to said first layer, the cement being employed in all forms of the fabric to hold the threads together in the form of a sheet, as well as to hold several layers together. The fabric may now be severed at the middles of the diagonal threads into widths suitable for a tire, and the ends of the threads at the line of severance from the last tire-width of the fabric are stuck to the surface of the drum by means of the cement, so that they may be properly drawn around the drum when the machine is again started. The machine is stopped at the end of each revolution of the drum, and each two revolutions of the drum produces six tire-widths of fabric. If desired, a fabric having parallel transverse threads may be made on the machine by withdrawing both sliding lugs from the cam-grooves and thus allowing the comb-bars to remain stationary.

The solid surfaces formed by the sides of the drum provide plane supports for the threads of the fabric, so that the threads may be presented perfectly smooth for the application of the cement which binds them together into a sheet of fabric, and so that the cement may just enter between the threads in the fabric without projecting beyond the surface of the same, as it would be liable to do if the threads were presented without solid backing or support.

Other modes of applying the principle of my invention may be employed for the mode herein explained. Change may therefore be made as regards the mechanism thus disclosed, provided the principles of construction set forth, respectively, in the following claims are employed.

I therefore particularly point out and distinctly claim as my invention—

1. In a machine for making fabric for vehicle-tires, the combination of a prismatic drum journaled to be revolved and formed with alternating narrow and wide closed sides and provided with longitudinal combs at the angles of said sides, a comb arranged to move parallel with the axis of the drum and between the teeth of which the threads may pass, and means connected to be actuated in unison with the drum and connected to the comb to move the latter longitudinally when the threads are laid upon the wide sides of the drum, whereby said threads will be laid obliquely on such spaces, the closed sides of the drum forming supports for applying a cement to unite the threads into one sheet, substantially as set forth.

2. In a machine for making fabric for vehicle-tires, the combination of a prismatic drum journaled to be revolved and formed with alternating narrow and wide closed sides and provided with longitudinal combs at the angles of said sides, a comb-bar arranged to move parallel with the axis of the drum, two cams having each an oblique cam portion, a portion in the line of their motion, and another oblique portion, and having each of said portions opposed to the other and having the oblique portions opposedly inclined, means for moving said cams to cause their portions to respectively correspond with a wide, a narrow and a wide side of the drum, in unison with the revolution of the same and two sliding lugs arranged to each engage one cam and to be withdrawn from the same and connected to have the comb-bar move with them, substantially as set forth.

In testimony that I claim the foregoing to be my invention I have hereunto set my hand this 24th day of May, A. D. 1895.

FREDRICK A. KRESS.

Witnesses:
WM. SECHER,
DAVID T. DAVIES.